United States Patent [19]
Dutkiewicz et al.

[11] Patent Number: 5,078,553
[45] Date of Patent: Jan. 7, 1992

[54] COMPACT DRILL SAMPLER FOR QUANTITATION OF MICROORGANISMS IN WOOD

[75] Inventors: Jacek Dutkiewicz; Czeslaw Kwapiszewski, both of Lublin, Poland; Stephen A. Olenchock, Morgantown; Daniel Lewis, Kingwood, both of W. Va.

[73] Assignee: The Government of the United States of America, as represented by the Secretary of the Department of Health and Human Services, Washington, D.C.

[21] Appl. No.: 474,923

[22] Filed: Feb. 6, 1990

[51] Int. Cl.⁵ .............................................. B23B 45/00
[52] U.S. Cl. ........................................ 408/67; 408/85; 408/202
[58] Field of Search .................. 408/67, 85, 112, 202, 408/24.1 S

[56] References Cited

U.S. PATENT DOCUMENTS 2,608,114  8/1952  Martin et al. ..................... 408/202
4,921,375  5/1990  Famulari ............................ 408/67

FOREIGN PATENT DOCUMENTS 2026596  12/1971  Fed. Rep. of Germany ........ 408/85
2514064  10/1976  Fed. Rep. of Germany ... 408/241 S
2632221  12/1989  France ............................... 408/72 R
219509    9/1986  Japan ................................... 408/67
814590    3/1981  U.S.S.R. ............................ 408/202

Primary Examiner—Daniel W. Howell
Attorney, Agent, or Firm—Lowe, Price, Leblanc & Becker

[57] ABSTRACT

An apparatus for sampling and collecting wood samples for analysis purposes which includes a boring bit surrounded by a chamber into which the boring bit draws samples and from which the samples are passed to a collection container. The boring bit is housed in a pair of slidably connected housing members which determine the depth that the boring bit enters a wood sample. Collected samples are analyzed for microbial contaminates.

9 Claims, 7 Drawing Sheets

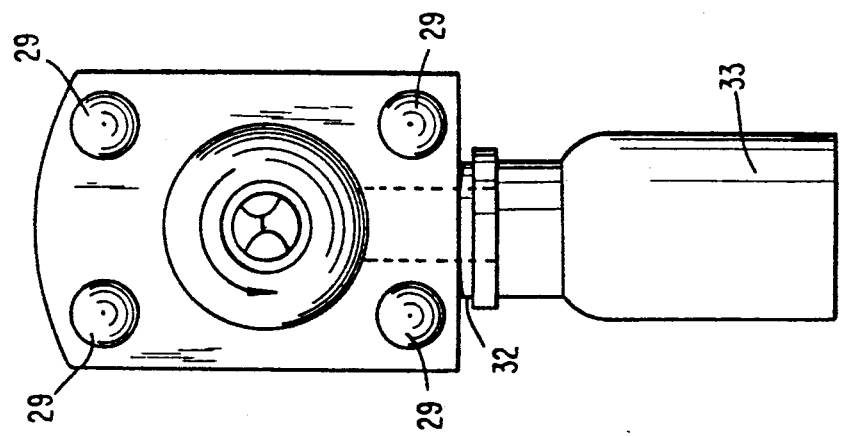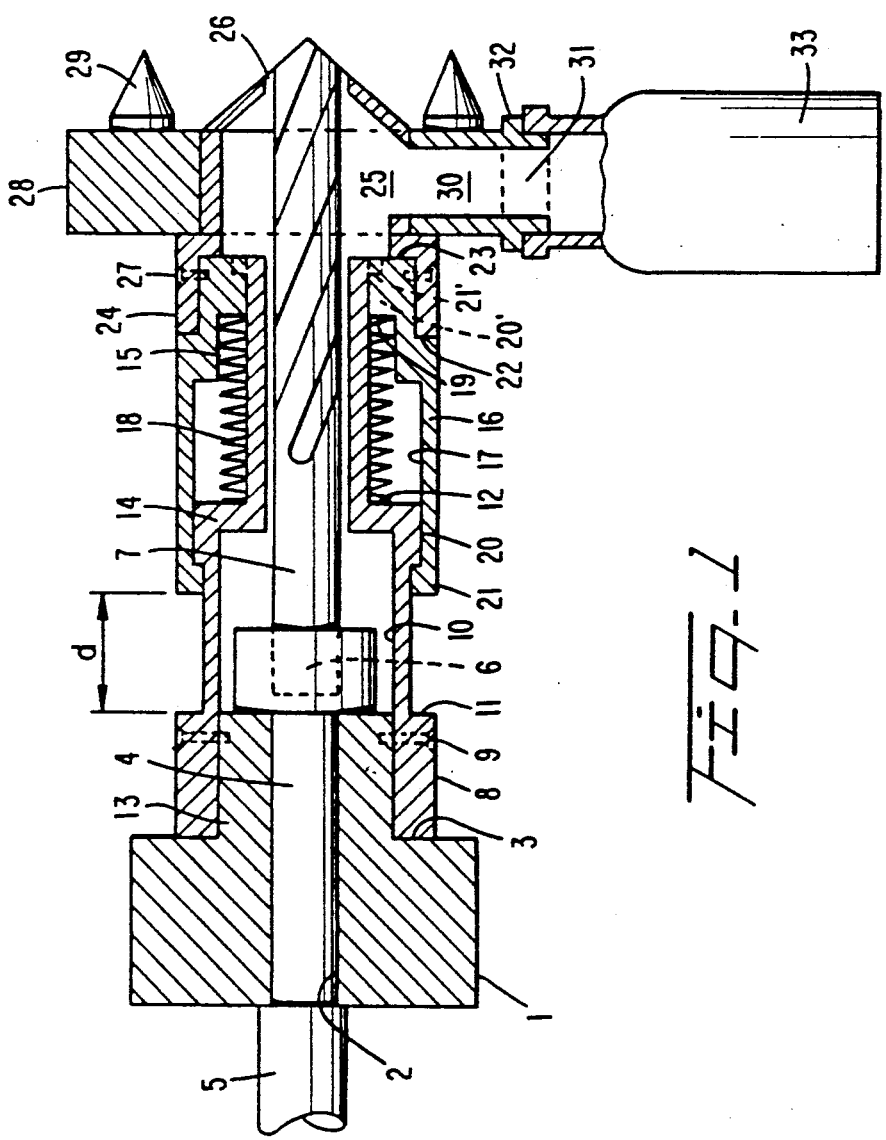

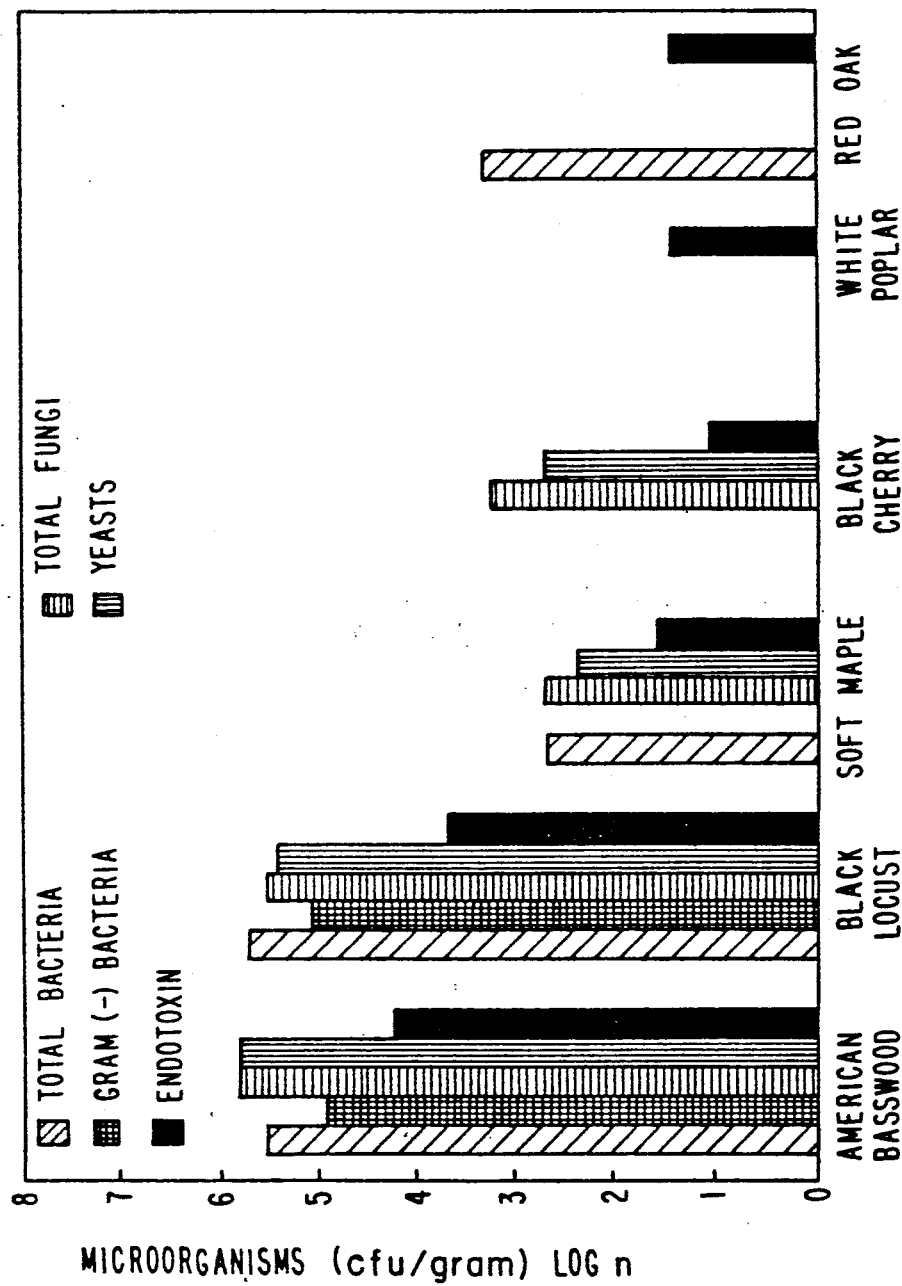

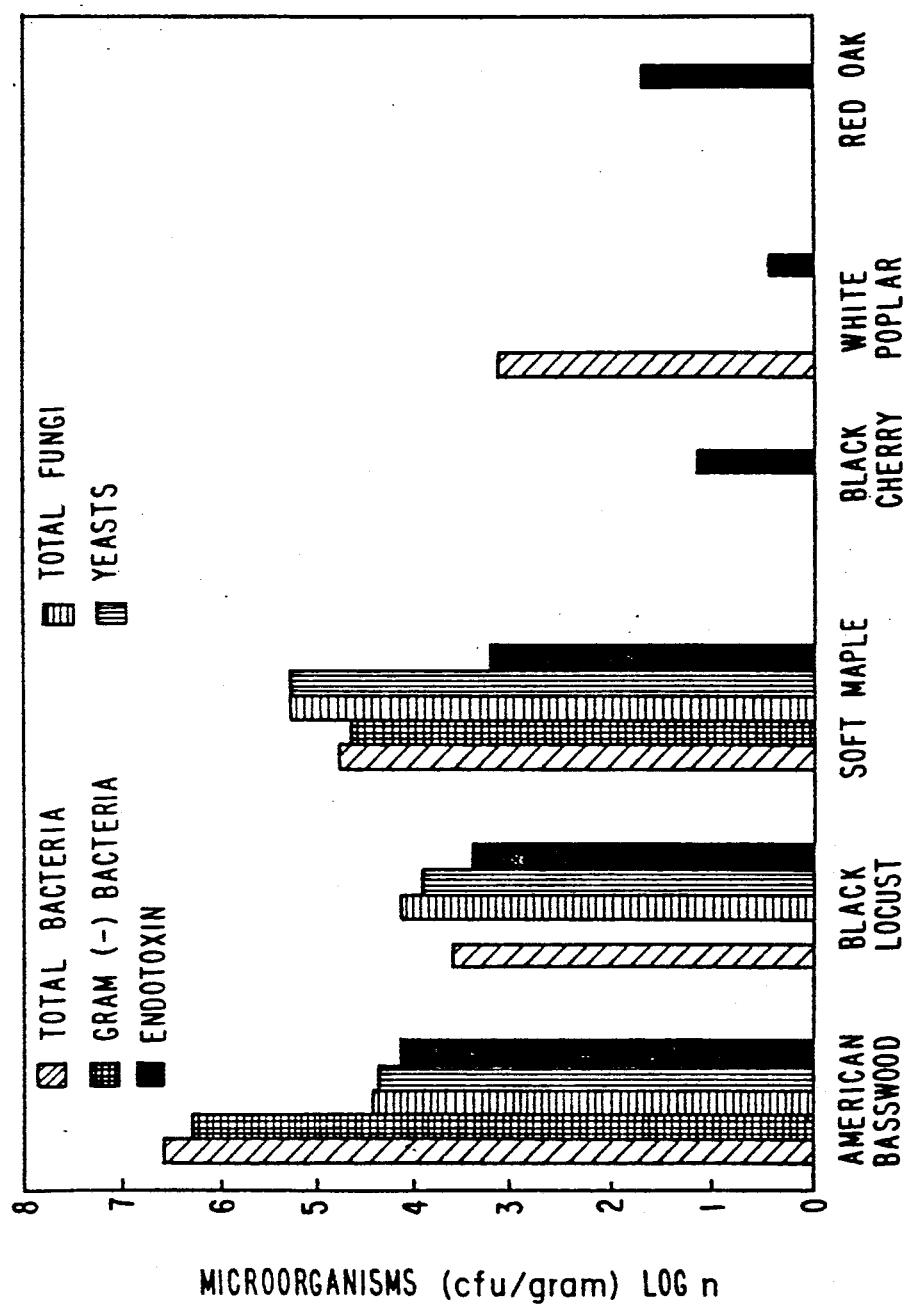

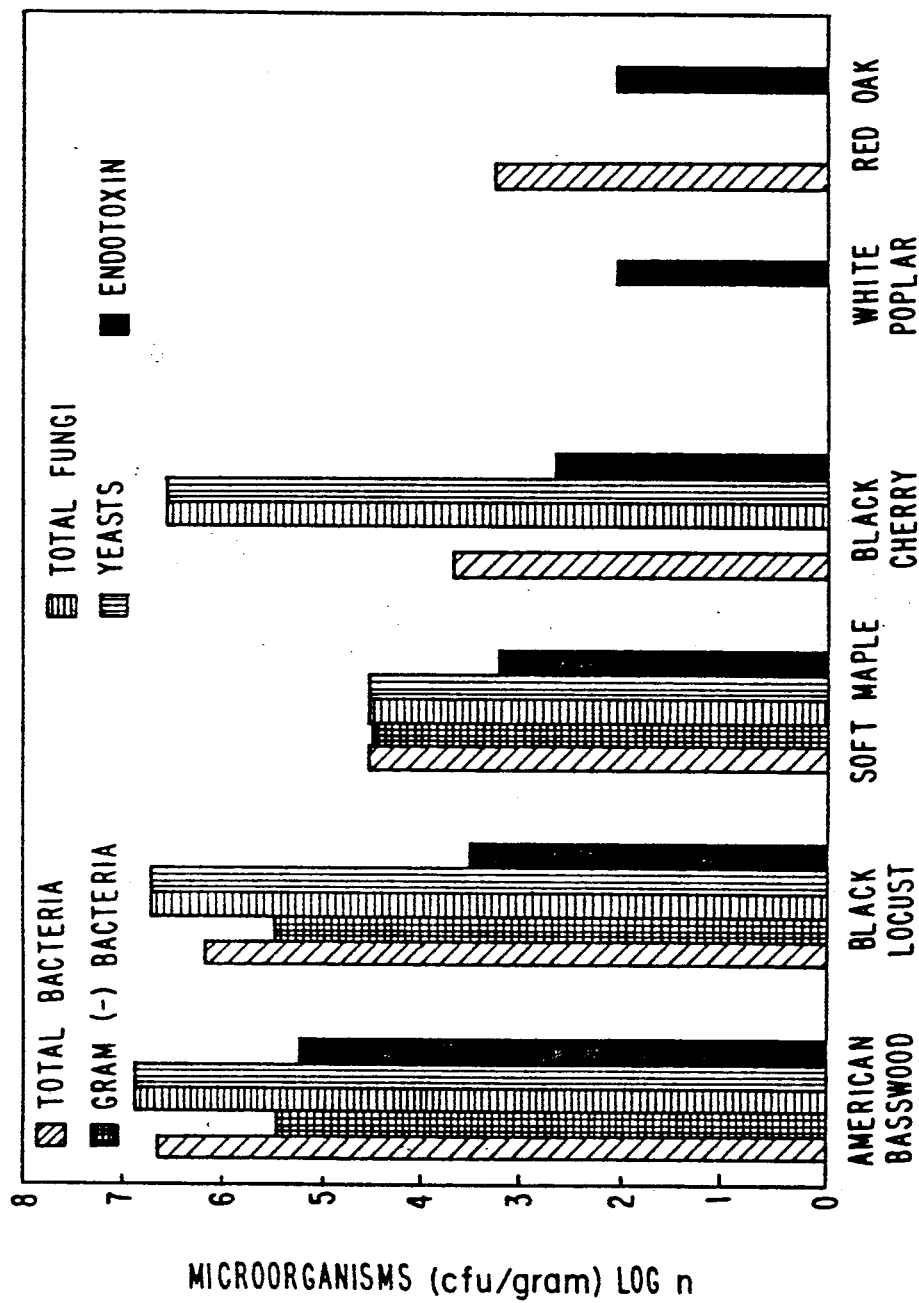

COMPACT DRILL SAMPLER FOR QUANTITATION OF MICROORGANISMS IN WOOD

TECHNICAL FIELD

The present invention relates to apparatus and methods for obtaining wood samples for analysis. In particular, the present invention relates to apparatus and methods for obtaining, preparing and analyzing wood samples for microbial contaminates.

BACKGROUND ART

Stored wood is often colonized by bacteria and fungi which degrade the condition of the wood and also create potential health hazards for woodworkers who are exposed to inhalation of the sawdust contaminated with microorganisms and their products. Airborne wood dust may contain bacterial and fungal allergens, endotoxins produced by gram-negative bacteria, and tremorgenic mycotoxins which can cause immunopathogenic changes and pulmonary diseases in exposed individuals.

Occupational exposure to wood dust is suspected as being a cause of respiratory diseases such as hypersensitivity pneumonitis (allergic alveolitis), asthma and chronic obstructive lung disease (COLD). The etiology of there diseases is not fully known; however, both the allergenic and/or toxic constituents of wood tissue itself and the substances produced by microorganisms developing in wood have been suggested as being potential causative agents. Many species of allergenic and/or toxic molds developing on wood including *Alternaria tenuis, Aspergillus fumigatus, Cryptostroma corticale, Mucor spp., Paecilomyces spp., Penicillium spp.,* and *Rhizopus spp.* have been known to be causative agents of pulmonary diseases in woodworkers.

The quantitation and identification of microorganisms developing in particular kinds of wood are important to both wood technology and occupational health. However, existing methods of microbiological examination of the wood do not provide accurate quantitative data and are not sufficiently useful for both sciences. Usually, two-step procedures are used that include cutting of blocks or discs from wood by common hand tools or core borers, followed by sterilizing of the surface of the blocks by flaming. The samples are then split into small chips for inoculation by direct plating on the surface of agar media. Other methods include direct collection of the chips from a chisel, a saw blade, or the head surface of a drill or a grinder. Most of the existing methods are cumbersome and do not allow for the sterile collection of microbiological samples which is necessary for accurate quantitative examination. Moreover, existing methods involve processes which do not dependably pulverize wood samples enough for the effective extraction of the indigenous microbial flora and subsequent separation and counting of isolates.

The present invention is an improvement over existing wood sampling apparatus and method which provides for one-step sampling and collection apparatus and methods for accurately determining the concentration of microorganisms in a weight unit of wood and species composition of the microflora in wood.

DISCLOSURE OF THE INVENTION

It is accordingly one object of the present invention to provide apparatus for obtaining and collecting wood samples.

It is another object of the present invention to provide apparatus for obtaining and collecting wood samples in a single one-step operation.

A further object of the present invention is to provide apparatus which properly grinds a wood sample during sampling and collection thereof for subsequent analysis procedures.

It is a further object of the present invention to provide compact apparatus for convenient one-step field sampling and collection of wood samples.

A still further object of the present invention is to provide for methods of taking and collecting wood samples for subsequent analysis.

It is a still further object of the present invention to provide for methods for sampling and analyzing wood samples for microbial contaminants.

It is a still further object of the present invention to provide for methods for sampling and determining concentrations of microorganisms and species compositions in wood samples.

According to the present invention there is provided an apparatus for collecting wood samples which comprises:

- a first housing member mountable on a base member;
- a second housing member coaxially positioned on a portion of the first housing member in a telescopingly sliding manner;
- a spring means located in an annular space between the first and second housing members and providing a biasing force between the first and second housing members along the axial direction;
- a third housing member attachable to the second housing member and including means to collect wood samples; and
- a boring bit which extends through each of the housing members.

Also provided by the present invention is a method of collecting wood samples for analysis which comprises boring a wood specimen with a boring bit and collecting wood particles as they are removed by said boring bit in a collection container which is connected to a collection chamber which surrounds the boring bit.

BRIEF DESCRIPTION OF DRAWINGS

The present invention will now be described with reference to the annexed drawings, which are given by way of non-limiting examples only in which:

FIG. 1 is a side view schematic illustration of a sampling apparatus according to one embodiment of the present invention.

FIG. 2 is an end view schematic illustration of the sampling apparatus of FIG. 1.

FIGS. 3–8 are bar graphs illustrating concentrations of bacteria, fungi and endotoxin in various wood samples.

BEST MODE FOR CARRYING OUT THE INVENTION

Figure 6:
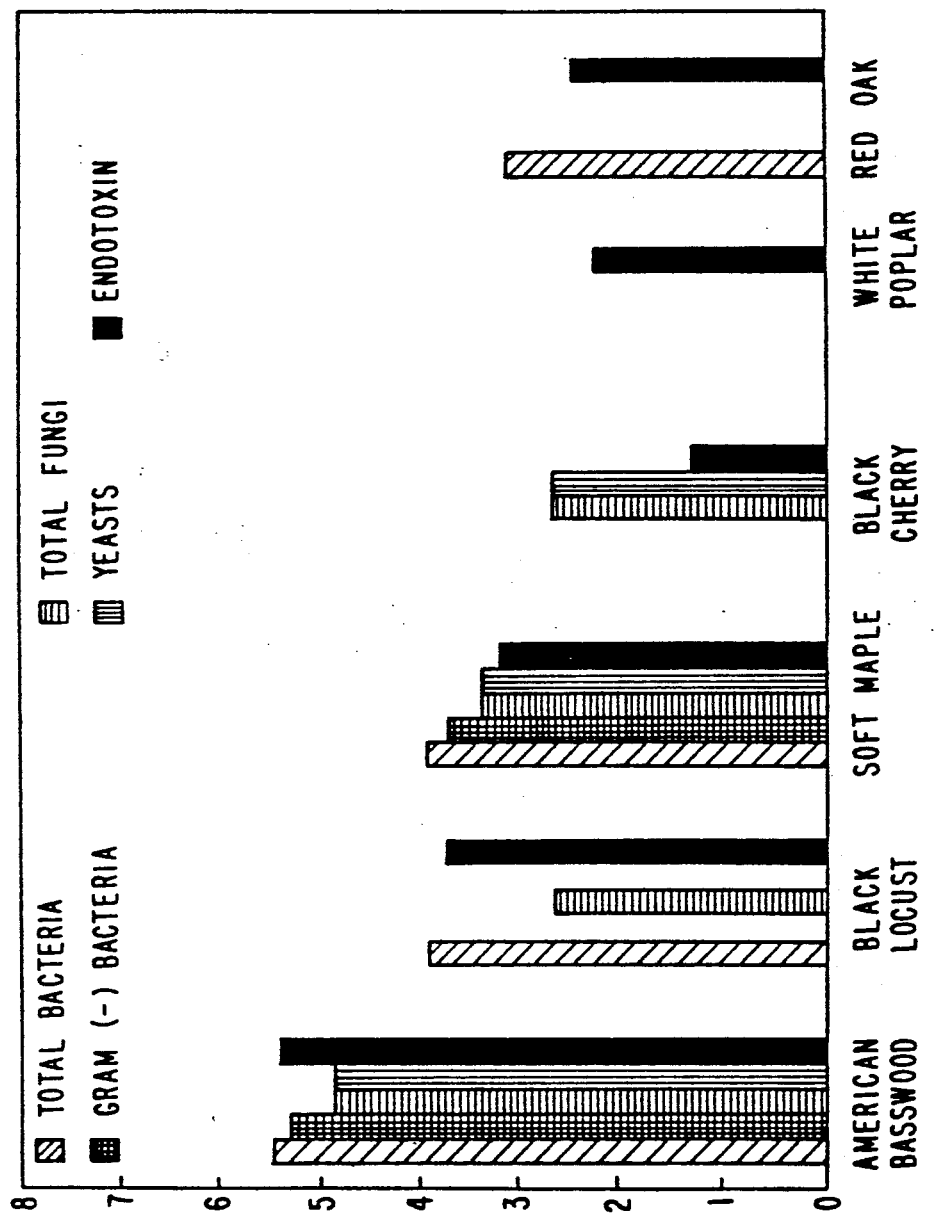

The apparatus of the present invention involves a drill-and-collection (DAC) device which takes a sample of pulverized wood in the course of one-step sterile sampling/collecting processes. The wood is ground with an appropriately graded boring bit and fine shavings produced thereby, which are in the size range of 0.01–5.0 mm (length) and 0.01–0.5 mm (thickness), are collected into a sterile container attached to the device. After collection, the samples are weighed, diluted and plated on agar media for determination of the concentration of the microorganisms per unit weight of the wood and the species composition of the indigenous microflora.

The apparatus of the present invention includes a boring device, i.e., a conventional boring bit which may be utilized for boring wood, and a support structure which maintains the alignment of the apparatus, particularly the boring bit, with respect to a wood specimen which is to be sampled. The support structure includes a spring biased telescoping portion which, as discussed in detail below allows a portion of the support structure to collapse in a telescoping manner as the boring bit enters the wood specimen during sampling. The amount or length that the support structure is allowed to collapse determines the depth that the boring bit enters the wood specimen. Thus, the telescoping structure functions to insure reproducible sample amounts are taken during a series of samplings.

The support structure also includes a positioning member at one end thereof which includes a number of positioning pins which contact the surface of a wood sample during a sampling or boring procedure. These positioning pins and positioning member determine the angle that the boring bit enters the wood specimen during sampling and thus insure uniform sampling with respect to the boring angle. The positioning pins further function to stabilize the apparatus during use and therefore contribute to the safety thereof.

The support structure further defines an internal chip or sample collecting chamber in which ground wood sample removed from the wood specimen during a sampling process is drawn by the boring bit. As the ground wood enters the chip or sample collecting chamber, the ground wood falls or is removed from the boring bit and drops through a chip collection passageway into a collection container which is removably attached thereto.

The apparatus is preferably attached to a geared hand cranked device such as a hand crank mechanism of a conventional hand drill. In this regard, the apparatus includes a crank and spindle which transfer and apply rotational motion to mounting member which receives and supports the boring bit. Ideally, for field use, rotational motion is generated by a geared hand cranking device. In further embodiments a battery operated or other electric device could be utilized to supply the necessary rotational motion to the crank for sampling.

The apparatus is designed to be easily disassembled into a base member, the above-mentioned telescoping member, and a housing member which defines the chip collecting chamber and supports the positioning member. These components are made to be easily disassembled so that the internal surfaces of the apparatus by be accessible for sterilization prior to sampling procedures.

FIGS. 1 and 2 schematically illustrate a sampling apparatus according to one embodiment of the present invention. As illustrated, the sampling device includes a base member 1 having a through bore 2 therein. The base member 1 includes a stepped portion 3 for receiving a first housing member 8 which may be mounted thereon. Alternatively, as will become obvious, any structure could be utilized to connect the base member to the first housing member 8, including, for example, a flange on either or both the base member or the first housing member.

As illustrated, a spindle 4 passes through the through bore of base member 1. Spindle 4 is connected to a crank member 5 which is exterior to base member 1 on a side opposite to the stepped portion 3. The crank member 5 is connected to a suitable rotation means such as, in a preferred embodiment, a manually operated geared crank (not illustrated) of the type utilized in hand operated drills. However, base member 1 may be connected to any suitable housing that provides and transfers mechanical rotational motion to crank member 5. In other alternative embodiments base member 1 may be connected to a housing containing an electric motor which provides and transfers rotation motion to crank member 5.

On the side of the base member opposed to the crank member, spindle 4 is connected to a bit mounting means 6 which is designed to receive and secure a boring bit 7. Such bit mounting means may comprise a convention drill bit chuck or merely a collar with a set screw securing means. A boring bit is selected which produces fine wood shavings, which are in a size range of 0.01–5.0 mm (length) and 0.01–0.5 mm (thickness). For purposes of the present invention, a suitable size boring bit includes boring bits from one-eighth to one-half inch, with one-quarter inch bits being more preferred.

As indicated, base member 1 is connected to a first housing member 8 which may be fixedly attached to the base member by a suitable connecting means such as one or more screw connectors 9 as illustrated. Alternatively, the base member and first housing member may be connected by threaded connection surfaces that cooperate between stepped portion 3 of the base member and an internal bore of the first housing.

In a preferred embodiment as illustrated in FIG. 1, the first housing member 8 includes a internal through bore 10 which is coaxial with the through bore 2 of the base member 1 when the base and first housing members are connected together as describe above. The exterior surface of first housing member 5 includes first and second external step portions 11 and 12 which define reduced portions in the exterior cross sectional area of the first housing member. As illustrated, step portions 11 and 12 form a large 13, intermediate 14 and small 15 cross sectional portions.

In a preferred embodiment, the first housing member has a generally circular exterior cross section as viewed from either end thereof. In other embodiments, the exterior cross sectional shape of the first housing member may have any symmetrical or non-symmetrical shape. The only limitation on the external cross sectional shape of the first housing member is that the interior surface of the second housing member 16 (discussed below) be complimentary to the exterior surface of the first housing member for necessary cooperation of the elements as discussed in detail below.

A second housing member 16 having an internal stepped through bore 17 is coaxial with the first housing member. As illustrated in FIG. 1 the stepped through bore 17 of the second housing member 16 is shaped complementarily with the intermediate 14 and small 15 cross sectional portions of the first housing member so that the intermediate and small cross sectional portions of the first housing are slidingly receivable in the stepped through bore of the second housing member.

A spring means 18 is positioned within an annular space formed between the first and second housing members and between stepped portion 12 of the first housing member and an inner flange portion 19 of the second housing member The spring means 18 biases the first and second housing members so that an abutting portion 20 of the second housing member contacts a stop 21 formed on the exterior surface of the first housing member as illustrated in FIG. 1. Alternatively, in other embodiments of the present invention, a similar coacting abutting portion 20' and stop 21' could be provided on the other end of the first and second housing members as illustrated in phantom lines. Moreover, the coacting abutting and stop portions may comprise discrete elements or portions of the first and second housing members or may extend completely around the first and second housing members in the transverse direction.

Spring means 18 preferable includes a single spring which surrounds the small cross sectional portion 15 of the first housing member. In further embodiments, the spring means may comprise two or more individual spring members which are diametrically positioned around the central axis of the first and second housing members. In addition to the spring means, abutment washers may be positioned in the annular space between the first and second housing members on either end of the spring means (not illustrated) between the ends of the spring means and the first and second housing members.

The end of the second housing member most distant from the base member includes an external reduced stepped portion 22 which is shaped to be received in a complementarily shaped internal bore 23 of a third housing member 24. The internal bore of the third housing member includes a chip collector chamber 25 in which ground wood removed by boring bit 7 is drawn into the third housing member and allowed to fall or be removed from the boring bit. In this regard, as illustrated in FIG. 1, the third housing member terminates angularly to an opening 26 which surrounds the point of the boring bit when the first and second housing members are in an extended position with respect to one another as illustrated in FIG. 1.

The third housing member is receivable by the second housing member and may be fixedly attached thereto by similar connection means which are utilized to secure the base member and the first housing member together, e.g., one or more screw connectors 27 or coacting threads on the surfaces of the second and third housing members (not illustrated).

A positioning member 28 surrounds the third housing member as illustrated and includes a number of positioning pins 29 which are utilized to align the sampling device against a wood specimen during sampling. The pins, as illustrated in FIG. 2, are arranged to maintain the alignment of the sampling device with respect to a wood specimen so as to insure that the boring bit penetrates the wood specimen at the same angle and a depth during each sampling operation.

A chip collection passageway 30 extends through an opening 31 in the bottom of the positioning member 28 and connects with the chip collection chamber 25. A chip collection container receiving connector 32 connects with the chip collection passageway 30 at the bottom of the positioning member. A chip collection container 33 is provided which is receivable and attachable to the receiving connector. In a preferred embodiment, the chip collector container was held in position by means of a spring mechanism which urged the chip collection container upwardly into the receiving connector.

In operation, boring bit and interior parts of the first and third housing members and the positioning member are sterilized by wiping the surfaces of these elements with 70 percent ethanol or propanol followed by flaming. During sterilization, the sampling apparatus may be disassembled by detaching the base and third housing members from the first and second housing members. After sterilization, a sterile, pre-weighed collection container, e.g., glass or metal vial, is attached to the chip collection container connector. The surface of a wood specimen to be sampled is chemically sterilized with alcohol and/or Clorox ® (a commercial 5.25% sodium hypochlorite solution) and a sample is taken by rotating the crank member while continuously pressing the sampling device towards the wood specimen.

During sampling, pressure applied to the positioning member is transferred from the third housing member to the second housing member and against the biasing force of the spring means. As the biasing force of the spring member is overcome, the first housing member telescopically slides into the second housing member a distance "d" until the end of the second housing member contacts stepped portion 11 of the first housing member. In this manner, the boring bit moves a predetermined distance "d" to produce uniformly equal samples each time a sample is taken. In a preferred embodiment the maximum distance "d" was about 17 mm. While 17 mm is a preferred maximum distance, any distance below 17 mm which produces collectable wood chips may be utilized.

Wood removed from the wood specimen by the boring bit is ground by the boring bit into fine particles and carried through the grooves of the boring bit into the chip collection chamber and allowed to fall through the chip collection passageway into the attached collection container. After sampling, the collection container is weighted and the microbial count is done by the dilution plating method discussed in detail below.

The following examples are presented to illustrate the invention which is not intended to be considered as being limited thereto.

EXAMPLE 1

In this example, three wood samples were taken from each of three stacked logs stored for about 6 weeks at a sawmill in Kingwood, West Virginia. American basswood (*Tilia americana*), soft maple (*Acer saccharinum*) and red oak (*Quercus coccinea*) were sampled. From each log, one sample was taken from the heartwood (by boring from the transverse section), one from the sapwood (by boring from the transverse section), and one from the bark (by centripetal boring).

Prior to sampling, the wood surface was sterilized by wiping the surface with 70 percent propanol and Clorox ® (a commercial 5.25% sodium hypochlorite solution). After sterilization of the surface, an average sample was taken by multiple boring (5-7 times) in a circle up to 3 cm in diameter. The samples were suspended in phosphate buffered saline (PBS) containing 0.1 percent of Tween 80 ®, diluted, and inoculated on blood agar for analysis of total aerobic bacteria and on eosin methylene blue agar (EMB, Difco) for analysis of gram-negative bacteria. The agar plates were incubated for 2 days at 35° C. After incubation the colonies were counted.

The results from this example are listed in Table I below.

TABLE I

| Concentration of bacteria in the samples of different kinds of wood | | | |
|---|---|---|---|
| Kind of wood | Site of sampling | Total aerobic bacteria (thousands cfu per gram) | Gram negative bacteria (thousands cfu per gram) |
| American basswood | Heartwood | 385.0 | 83.0 |
| | Sapwood | 4,500.0 | 300.0 |
| | Bark | 85.0 | 53.0 |
| Soft maple | Heartwood | 0.5 | 0 |
| | Sapwood | 41.0 | 38.0 |
| | Bark | 125.0 | 0 |
| Red oak | Heartwood | 2.0 | 0 |
| | Sapwood | 2.0 | 0 |
| | Bark | 0.5 | 0 | cfu = colony forming units

From the results listed in Table I it is observed that large variations in the microbial content of the wood appear to be dependent on the kind of wood and the location of the sampling sites. For example, the sapwood of American basswood contained 4.5 million colony forming units (cfu) of bacteria per gram, which was over 2000-fold more than the sapwood of red oak and over 100-fold more than the sapwood of soft maple. Similarly, the concentration of the endotoxin-producing gram-negative bacteria was high in all wood samples from the American basswood while these organisms were totally absent in the wood samples from red oak.

EXAMPLE 2

In this example two series of microbiological wood samples were taken at a two month period from timber logs stored in a lumber yard at a sawmill in Kingwood, West Virginia. The logs had been stored for a period of 4-6 weeks prior to the first sampling and did not show any apparent signs of decay. At each sampling time, samples were taken from a log of each of the following species: American basswood (*Tilia americana* L.), black cherry (*Prunus serotina* Ehrh.), black locust (*Robinia pseudoaccacia* L.), red oak (*Quercus coccinea Muenchh.*), soft maple (*Acer saccharinum* L.) and white poplar (*Populus alba* L.). From each log, one sample was taken from the heartwood (by boring from the transverse section), one from the sapwood (by boring from the transverse section), and one from the bark (by centripetal boring).

Prior to sampling, the wood surface was sterilized by wiping the surface with 70 percent propanol and CLO-ROX® (a commercial 5.25% sodium hypochlorite solution). After sterilization of the surface, an average sample was taken by multiple boring (5-7 times) in a circle up to 3 cm in diameter.

The concentrations of bacteria and fungi in the wood samples were determined by dilution plating in the manner now to be discussed. Aliquots of 200 mg of each sample were suspended in 20 ml of sterile phosphate buffered saline (Sigma Chemical Co., St. Louis, Mo.) containing 0.1% (v/v) TWEEN 80 ® (Fisher Scientific Co., Fair Lawn, N.J.) and, after vigorous shaking, serial dilutions were made up to $10^{-6}$. 0.1 ml aliquots of each dilution were spread on duplicate sets of the following media: (i) sheep blood agar for total aerobic bacteria, (ii) eosin methylene blue agar (EMB agar; Difco Lab., Detroit, Mich.) for gram-negative bacteria, (iii) half-strength tryptic soya agar (Difco) for thermophilic actinomycetes, (iv) rose bengal streptomycin agar (RBS) for total fungi, and (v) yeast malt agar for yeasts. The blood agar and EMB plates were incubated for 48 hours at 35° C., the tryptic soya plates were incubated for 120 hours at 55° C., and the RBS and yeast malt plates were incubated for 96 hours at 28° C.

Following incubation, bacterial colonies were counted and differentiated on the basis of colony morphology, Gram reaction, and biochemical reactions. The gram-positive isolates were identified according to Bergey's Manual (Bergey's Manual of Systemic Bacteriology, Vol 2, The Williams and Wilkin Co., Baltimore (1986)). The gram-negative isolates were identified with the API$^R$ Systems 20 E (for enterobacteria) and NFT (for non-fermenting bacteria) (API Analytab Products, Plainview, N.Y.), using supplementary biochemical tests selected according to Bergey's Manual (Bergey's Manual of Systemic Bacteriology, Vol 1, The Williams and Wilkin Co., Baltimore (1984)) and API ® Systems recommendations Mold colonies were counted and differentiated on the basis of morphological properties. Representative yeast colonies were isolated and differentiated on the basis of morphological and biochemical properties. Final results for microbial concentrations were reported in terms of the colony forming units (cfu) in one gram of wood.

For endotoxin determination, 100 mg portions of the wood samples were extracted with 5 ml of sterile non-pyrogenic water (Travenol Laboratories Inc., Deerfield, Ill.) by rocking for 60 minutes at room temperature. The suspension was centrifuged at 1000 g for 10 minutes to remove particulate debris and the supernatant fluid was separated for further analysis. Quantification of gram-negative bacterial endotoxin content was performed in duplicate by a quantitative chromogenic modification of the Limulus amebocyte lysate test (QCL-1000; Whittaker Bioproducts, Walkersville, Mass.). Results were reported in terms of Endotoxin Units (EU) in one gram of ground wood.

The Student's t-test for matched pairs, test for linear regression and chi-square test were used for statistical evaluation of the results.

The results of the tests are given in FIGS. 3-8. As observed in the Figures, the concentration of microorganisms and endotoxin varied significantly with the kind of wood examined (P<0.001) The highest levels of bacteria, fungi and endotoxin were found in the wood samples from logs of American basswood and black locust ($10^3$-$10^8$ cfu/gm, $10^2$-$10^7$ cfu/gm and $10^4$-$10^6$ EU/gm, respectively. The levels were lower in the logs of soft maple and black cherry (0-$10^6$ cfu/gm, 0-$10^7$ cfu/gm and $10^1$-$10^4$ EU/gm, respectively) and the lowest in the logs of white poplar and red oak (0-$10^4$ cfu/gm, 0-$10^5$ cfu/gm and 10-$10^5$ EU/gm, respectively).

Figure 7:
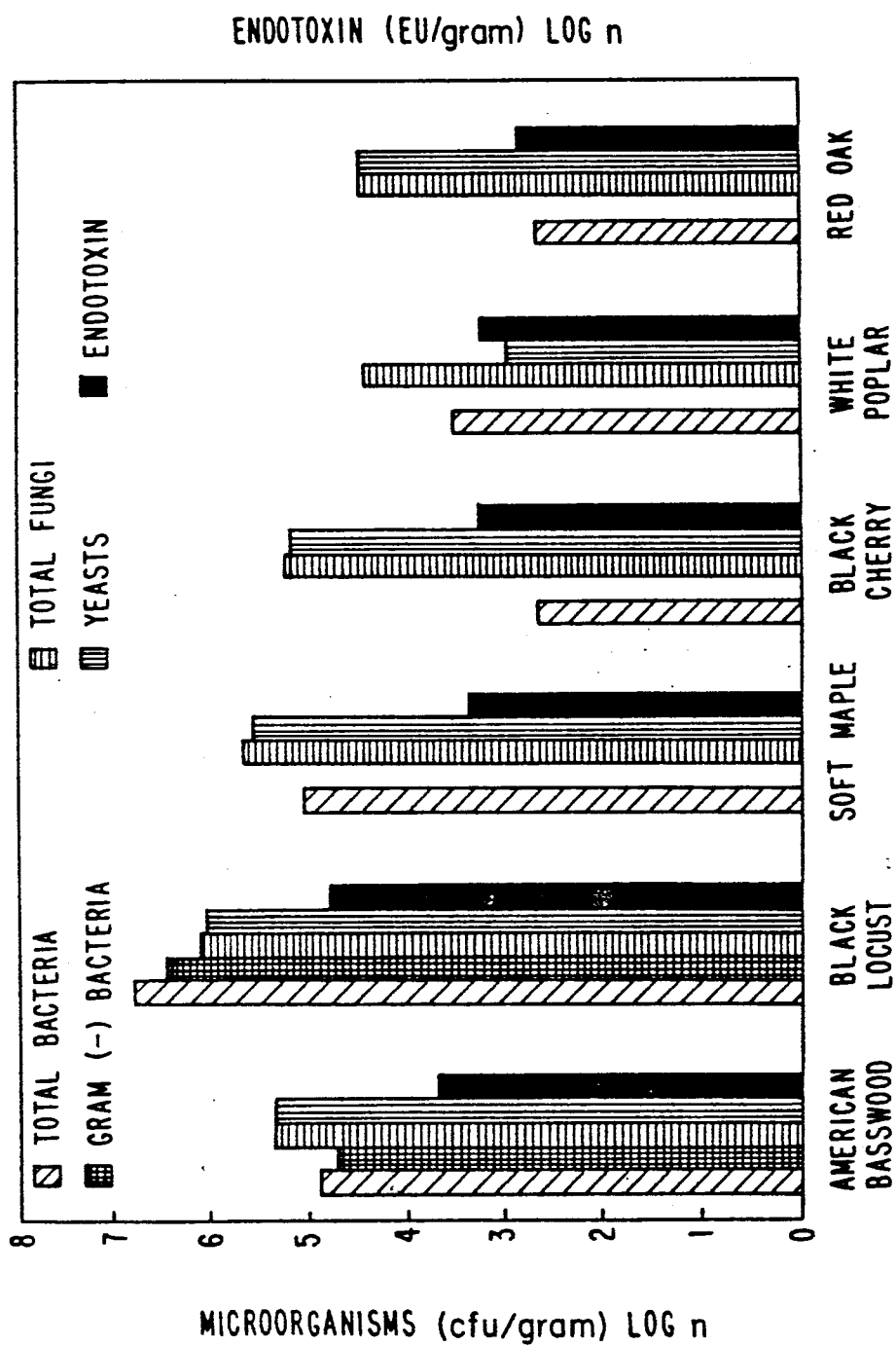
Figure 8:
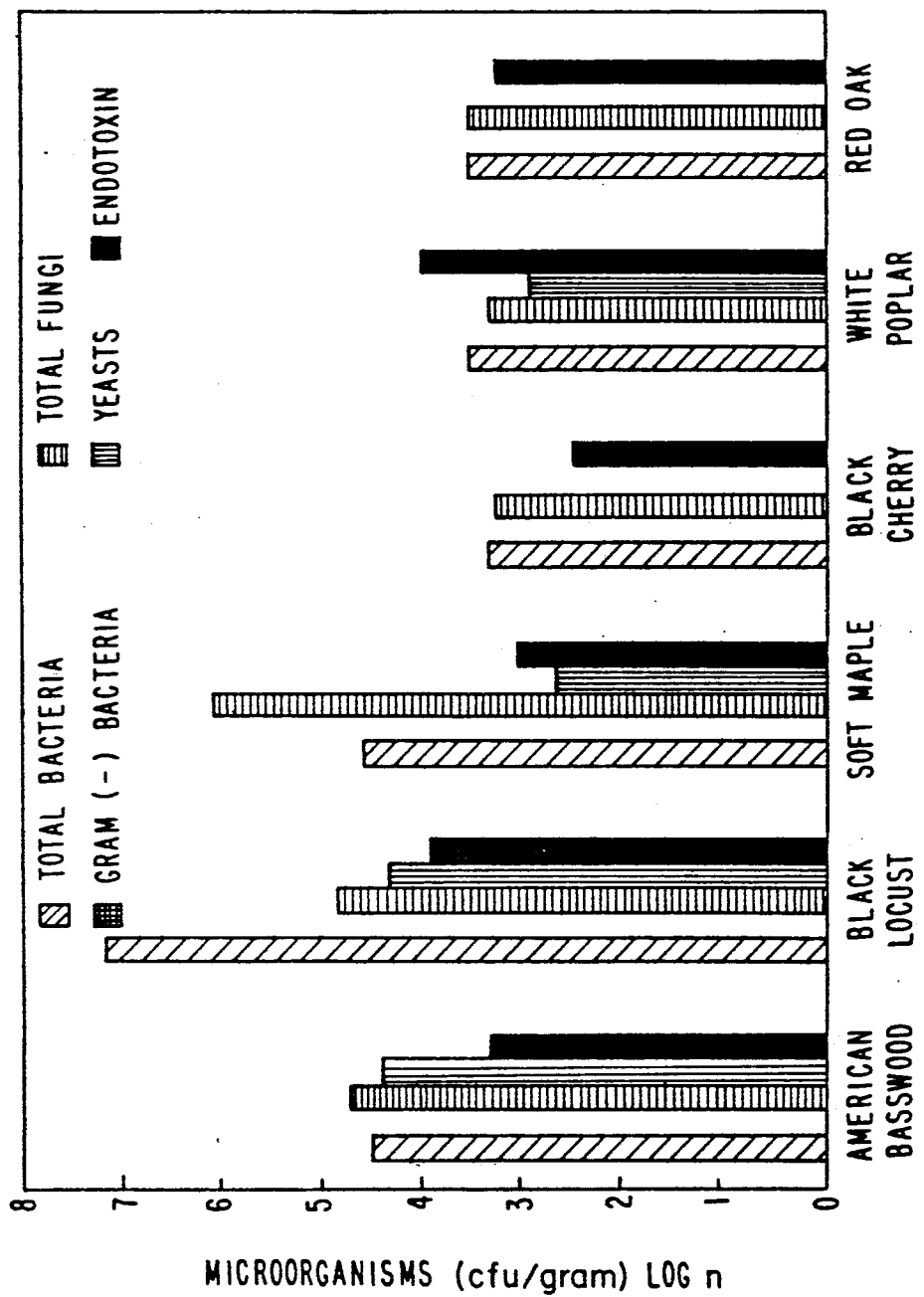

High concentrations of bacteria, fungi and endotoxin were found in all the examined kinds of wood tissue: heartwood (FIGS. 3 and 4), sapwood (FIGS. 5 and 6) and bark (FIGS. 7 and 8). No significant differences were noted between the contamination rates over the two month sampling period (P>0.05).

In most of the samples of heartwood and sapwood, gram-negative bacteria dominated the total bacteria flora. Except for two cases (FIG. 6), this was not observed in the bark samples. In bark samples at the later sampling period, viable gram-negative bacteria were completely absent. The very high level of bacteria found in the bark of the black locust was due to the presence of large numbers of spore-forming bacilli (FIG. 8). For each kind of wood tissue (heartwood, sapwood and bark) a significant correlation was found between the concentration of gram-negative bacteria and endotoxin ($P<0.05$). No thermophilic actinomycetes were found in the examined wood samples.

Twelve species and/or genera of gram-negative bacteria and seven genera of gram-positive bacteria were found in the wood samples as listed in Table II below.

teria of the genus Bacillus and coryneform bacteria belonging to the genera Arthrobacter, Brevibacterium, Corynebacterium, and Microbacterium.

Table III below lists the types of fungi which was observed in the various samples. As observed in Table III (and FIGS. 3–8) yeasts were the predominate fungi observed in each kind of wood sample. The most numerous yeasts were presumptive Ascomycetes and their anamorphs, i.e., they gave a negative reaction with

TABLE II

SPECIES OF BACTERIA OCCURRING IN WOOD SAMPLES

| Name of the species | Heartwood | Sapwood | Bark | Maximal concentration ($\times 10^5$ cfu/gram) |
|---|---|---|---|---|
| GRAM-NEGATIVE BACTERIA | | | | |
| *Fermentative* | | | | |
| *Citrobacter freundii* | + (B, M) | ++ (B), + (M) | | 0.10 (Sapwood, B) |
| *Enterobacter agglomerans* | ++ (B), + (M) | +++ (B), + (M) | ++ (B, L) | 3.00 (Sapwood, B) |
| *Enterobacter cloacae* | | ++ (M) | | 0.38 (Sapwood, M) |
| *Klebsiella sp.* | | +++ (B), + (M) | | 1.45 (Sapwood, B) |
| *Serratia rubidaea* | ++ (L) | ++ (L) | | 0.41 (Sapwood, L) |
| *Non-fermentative* | | | | |
| *Acinetobacter calcoaceticus* | + (M) | | +++ (L) | 30.50 (Bark, L) |
| *Agrobacterium radiobacter* | +++ (L) | +++ (L) | | 2.64 (Sapwood, L) |
| *Pseudomonas fluorescens* | + (M) | | | 0.07 (Heartwood, M) |
| *Pseudomonas maltophilia* | + (M) | | | 0.02 (Heartwood, M) |
| *Pseudomonas oryzihabitans* | +++ (B) | | | 15.10 (Heartwood, B) |
| *Pseudomonas putida* | +++ (B), ++ (M) | + (B) | | 3.84 (Heartwood, B) |
| *Pseudomonas stutzeri* | ++ (B), + (M) | + (M) | | 0.45 (Heartwood, B) |
| GRAM-POSITIVE BACTERIA | | | | |
| Bacillus spp. | +++ (B), ++ (L), + (M) | +++ (L), + (B, M) | +++ (L, M), ++ (B), + (C, O, P) | 154.00 (Bark, L) |
| Coryneform bacteria* | +++ (B, L), + (P) | ++++ (B, L) + (C, M, O) | +++ (L), ++ (B, M), + (C, P) | 20.30 (Heartwood, B) |
| Staphylococcus spp. | + (M, O, P) | +++ (L), + (O) | + (P) | 5.00 (Sapwood, L) |
| Streptomyces spp. | | +++ (L) | ++ (L), + (B) | 2.51 (Sapwood, L) |

B = American Basswood
M = Soft Maple
+ = occurred in concentration below $1 \times 10^4$ cfu/gram
*Comprise: Arthrobacter spp., Brevibacterium spp. Corynebacterium spp.,
C = Black Cherry
O = Red Oak
++ = occurred in concentration $1 \times 10^4$–$1 \times 10^5$ cfu/gram
L = Black Locust
P = White Poplar
+++ = occurred in concentration over $10^5$ cfu/gram The gram-negative flora comprised five fermentative species (belonging to the Enterobacteriaceae family) which, in most cases, were associated with the sapwood and seven non-fermentative species (mostly of the genus Pseudomonas) which were mostly associated with the heartwood. Among the gram-positive bacteria, the most common organisms were endospore-forming bacteria.

Diazonium Blue B (DBB). Yeast fungi tended to be found in the greatest number in the sapwood. Species of yeast isolated included undetermined *Candida spp.* (include both DBB+ and DBB− species), *Candida zeylanoides*, *Crytococcus laurentii*, *Hansenula silvicola*, and *Rhodotorula glutinis*.

TABLE III

FUNGI OCCURRING IN WOOD SAMPLES

| Organism | Heartwood | Sapwood | Bark | Maximal concentration ($\times 10^5$ cfu/gram) |
|---|---|---|---|---|
| DBB− yeasts[a] | +++ (B,L), ++ (M) + (C) | +++ (B,C,L), ++ (M) | +++ (B,L,M), ++ (C,O), + (P) | 78.35 (Sapwood, B) |
| DBB+ yeasts[b] | ++ (B,L,M) | +++ (B), ++(C,L) | ++(B,C,L,O) | 1.45 (Sapwood, B) |
| Acremonium sp. | ++ (L), + (B) | ++ (L) | +++ (M), + (B,P) | 14.00 (Bark, M) |
| Oidiodendron sp. | | | ++ (C,M) | 0.79 (Bark, M) |
| Penicillium sp. | ++ (L) | ++ (B,L) | ++ (L,P), + (B,C,O) | 0.72 (Bark, L) |
| Trichoderma sp. | | ++ (C) | ++ (B,L) | 0.49 (Bark, L) |

TABLE III-continued
FUNGI OCCURRING IN WOOD SAMPLES

| Organism | Heartwood | Sapwood | Bark | Maximal concentration ($\times 10^5$ cfu/gram) |
|---|---|---|---|---|
| Nonsporulating | + (B,C,M) | | ++ (L,M), + (B,O,P) | 0.26 (Bark, M) |

[a]Negative reaction wiht Diazonium Blue B (DBB); presumptive Ascomycetes and their anamorphs (includes *Candida zeylanoides*, other undetermined *Candida* spp., and *Hansenula silvicola*.
[b]Positive reaction with DBB; presumptive Basidiomycetes and their anamorphs (includes undetermined *Candida* spp., *Cryptococcus laurentii*, and *Rhodoturula glutinis*).
B = American Basswood
M = Soft Maple
+ = occurred in concentration below $1 \times 10^4$ cfu/gram
C = Black Cherry
O = Red Oak
++ = occurred in concentration $1 \times 10^4 - 1 \times 10^5$ cfu/gram
L = Black Locust
P = White Poplar
+++ = occurred in concentration over $10^5$ cfu/gram Molds found in the samples included *Acremonium* (*Cephalosporium*) sp, *Alternaria sp.*, *Aspergillus fumigatus*, *Aureobasidium pullulans*, *Bispora sp.*, *Cladosporium sp.*, *Mortierella sp.*, and *Trichoderma sp.* as well as a number of fungi which could not be identified because of their failure to sporulate. The molds that occur in the greatest numbers were *Acremonium sp.*, *Oidiodendron sp.*, *Penicillium sp.*, and *Trichoderma sp.*. The highest number of molds were found in the bark.

The levels of microorganisms and endotoxin in timber logs showed notable variation depending on the species of the tree. The concentrations of bacteria and fungi in the most contaminated wood species tested (basswood and locust) exceeded the level of $10^6$ cfu/gm and were comparable to values of certain organic dusts known to be related to harmful respiratory effects.

The concentration of endotoxin in the tested wood in many cases reached a level of $10^5-10^6$ cfu/gm which corresponds to values found in organic materials such as grain, silage and mushroom farm pre-flush, which are known to be associated with respirator disorders. Some of the wood samples tested contained high concentrations of gram-negative bacteria including *Enterobacter agglomerans*, *Klebsiella spp.*, and *Pseudomonas putida* which are known producers of biologically active endotoxin which can cause pulmonary injury through non-specific stimulation of alveolar macrophages.

The occurrence of high concentrations of fungi in the wood presents another factor of potential respiratory risk for sawmill workers. The *Penicillium* species that were frequently isolated in the tested samples are a known source of pathogenic respiratory allergens. Other potentially pathogenic species isolated in the tested samples include *Aspergillus fumicatus* and *Aureobasidium pullulans*.

In addition to the health concerns, the composition of the microflora of examined timber, characterized by the prevalence of yeasts and gram-negative bacteria indicated that it was in the stage of "pioneer colonization" which precedes that stage of wood decay by brown rot and which rot fungi.

Although the invention has been described with reference to particular means, materials and embodiments, from the foregoing description, one skilled in the art can easily ascertain the essential characteristics of the present invention and various changes and modifications may be made to adapt the various usages and conditions without departing from the spirit and scope of the present invention as described in the claims which follow.

What is claimed:

1. An apparatus for collecting wood samples which comprises:
   a first housing member mountable on a base member;
   a second housing member coaxially positioned on a portion of said first housing member in a telescopingly sliding manner;
   a spring means located in an annular space between said first and second housing members and providing a biasing force between said first and second housing members;
   a third housing member attachable to said second housing member and including means to collect wood samples; and
   a boring bit which extends through each of said housing members, wherein said base member includes a internal through bore having a spindle positioned therein, said spindle being connected to a bit mounting member which is positioned in said first housing member and supports one end of said boring bit.

2. An apparatus for collecting wood samples according to claim 1, wherein said first housing member includes first and second stepped portions forming a large, intermediate and small cross sectional portions, and said second housing member is slidable along the intermediate and small cross sectional portions.

3. An apparatus for collecting wood samples according to claim 2, wherein said first and second housing members include cooperating abutment and stop means for retaining the first and second housing members against the biasing force of the spring means.

4. An apparatus for collecting wood samples according to claim 2, wherein one end of said second housing member contacts said first stepped portion of said first housing member when said spring means is compressed.

5. An apparatus for collecting wood samples according to claim 1, wherein said means to collect wood samples includes a collection chamber and a collection passageway which leads from said collection chamber to a collection container connector.

6. An apparatus for collecting wood samples according to claim 5 further including a collection container which is removably attached to said collection container connector.

7. An apparatus for collecting wood samples according to claim 1 further including a positioning member attached to said third housing member for positioning said apparatus with respect to a specimen to be sampled.

8. An apparatus for collecting wood samples according to claim 7, wherein said positioning member includes a number of positioning pins which project outwardly from said positioning member for contacting a specimen during a sampling procedure.

9. An apparatus for collecting wood samples according to claim 7, wherein one end of said third housing member terminates angularly to a central opening through which said boring bit passes during sampling.

* * * * *